Figure 2:
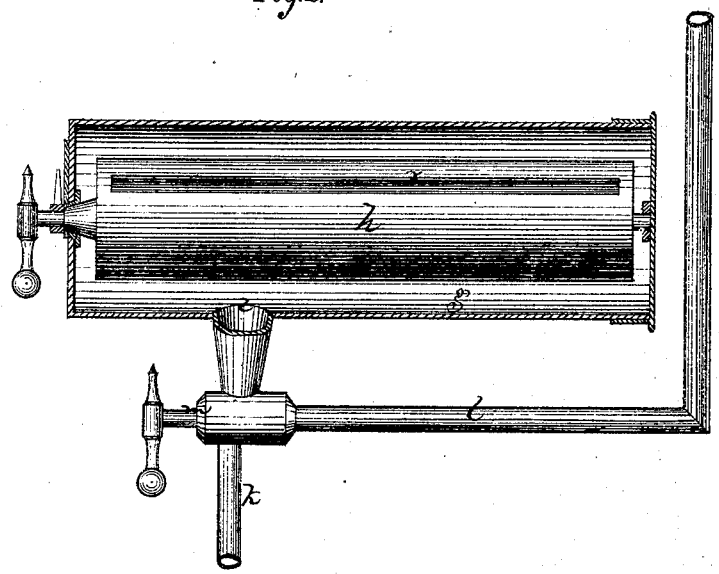

(132.)

JOHANN SCHMIDT.

Improvement in Liquid Measuring Apparatus.

No. 122,195.  Patented Dec. 26, 1871.

UNITED STATES PATENT OFFICE.

JOHANN SCHMIDT, OF VIENNA, AUSTRIA, ASSIGNOR TO SAMUEL HIRSCHL, OF DAVENPORT, IOWA.

IMPROVEMENT IN LIQUID-MEASURING APPARATUS.

Specification forming part of Letters Patent No. 122,195, dated December 26, 1871.

*To all whom it may concern:*

Be it known that I, JOHANN SCHMIDT, of Vienna, Austria, have invented a Liquid-Containing, Discharging, and Measuring Apparatus; and I do hereby declare that the following, taken in connection with the drawing which accompanies and forms part of this specification, is a description of my invention sufficient to enable those skilled in the art to practice it.

The invention relates to the construction of a liquid-containing and discharging apparatus, designed to indicate and regulate the amount of liquid drawn from it, so that not only may the amount drawn be measured, but so that the pre-indicated amount and no more can be drawn when the apparatus is set for the delivery of a given quantity. The invention consists in combining with a liquid-containing vessel an inner movable vessel, so constructed and arranged that by certain defined movements amounts of liquid, indicated by suitable mechanism at the outside of the apparatus, may be drawn from the apparatus when the discharge-cock is open.

The drawing represents apparatus embodying my invention.

Figure 1:
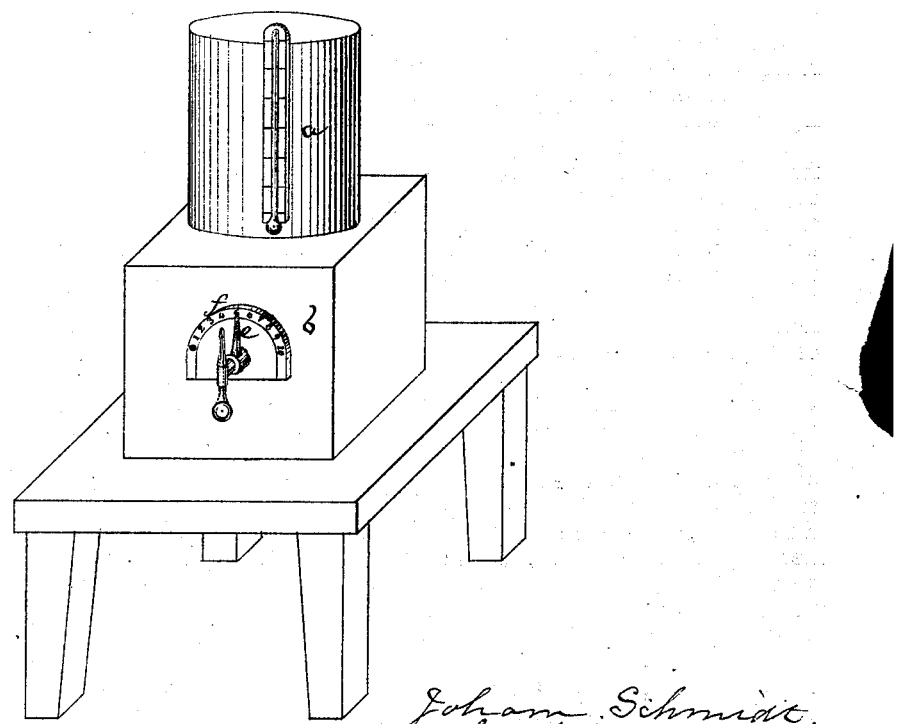

Figure 1 shows, in perspective elevation, one form of the apparatus, wherein $a$ denotes a tank or supply-vessel, from which certain discharge or delivering and measuring vessels contained in a sub-chamber, $b$, are filled. Said sub-chamber may be mounted upon a suitable stand or pedestal, so that the discharge-cock will be at convenient height for delivering the contents of the vessel in the chamber $b$, the measuring-vessels or cylinders being moved by rotating spindles, and the amount of liquid which will be discharged by such movement of the cock $c$ will be indicated by a pointer, $e$, which moves with the spindle and shows, against a scale or index, $f$, the amount so drawn off. Fig. 2 shows in section a rotary discharging and measuring vessel or hollow cylinder. This cylinder $h$ sets in another cylinder or vessel, $g$, from which a pipe or passage, $i$, connects with a discharge-spout, $k$, and with a supply-pipe, $l$, the pipe $l$ leading to the tank or reservoir above. The passage between the pipe $i$ and supply-pipe $l$ and discharge-pipe $k$ is regulated by a two-way cock, $m$, the stem of which, being turned in one direction, shuts off the communication between pipe $i$ and cylinder $g$ and outlet $k$ and opens communication between cylinder $g$ and supply-pipe $l$; while turned in another direction it shuts communication between cylinder $g$ and pipe $l$ and opens communication between cylinder $g$ and outlet-spout $k$. The common inlet and outlet of the chamber $g$ is at the bottom, and when the outlet to the spout $k$ is open all the liquid contained in the vessel $g$, and free to run out, is discharged by gravity. The inner cylinder $h$ is closed, except at a long slit or aperture, $x$, running the length of the cylinder, at its top.

When the passage from pipe $l$ into the cylinder $g$ is open the liquid fills cylinder $g$, and, rising to the top thereof, also flows down into and fills the cylinder $h$, the latter cylinder being so turned as to bring its mouth uppermost. Both cylinders being flushed or full, the pipe $l$ may be closed or the supply cut off, which being done, if, by the same or subsequent manipulation, the outlet-cylinder $g$, through spout $k$, be opened, it will be obvious that the liquid in cylinder $g$ will be drawn off, leaving the inner cylinder full. Now, if the space between the cylinders $g$ $h$ be gauged the quantity so drawn off will be known, and if the capacity of the inner cylinder be also known, and if, by trial or calculation, it be also known to what extent the cylinder must be rotated to discharge given fractional parts of such contents, it will be obvious that by attaching an index to the outer end of the main cylinder and a pointer to the shaft of the rotary vessel, the amount drawn off may be at any time determined; or the cylinder $h$ may be turned to bring the pointer against that part of the scale indicating the quantity of liquid to be drawn, which quantity will of course be discharged whenever the outlet is opened to permit the escape of the liquid through the spout. Thus the capacity of the large and small cylinders taken together may be one gallon, the capacity of the space between the two one-quarter of a gallon, and the degree of movement of the cylinder to discharge one quart, two quarts, and three quarts be determined and indicated by the scale and figures thereupon; then, by simply opening the outlet-cock or passage, one quart, or the liquid in the space between the cylinders, will run off and be measured, the mouth of the cylinder $h$ being kept uppermost. The pointer for this discharge is opposite the $\frac{1}{4}$ upon the scale. If the cylinder $h$ be now turned until the pointer is opposite $\frac{1}{2}$ another quart may be drawn from the vessel, and the movement of the pointer from the figures $\frac{1}{4}$ to $\frac{1}{2}$ will indicate that the difference between one-quarter and one-half of a gallon has been drawn. So in the next movement of the pointer from $\frac{1}{2}$ to $\frac{3}{4}$, and the next from $\frac{3}{4}$ to 1, or one gallon; one quart or one-quarter of a gallon will be thus drawn at each turn of the cylinder. But if, prior to each turn, the pointer be set back to $\frac{1}{4}$ and the supply-cock or passage be opened and the discharge-passage or cock be closed, then the cylinders may be again flushed, and, the supply-cock being closed and the outlet-pipe opened, one-quarter, one-half, three-quarters, or one gallon may be drawn at once and at one manipulation by carrying the pointer to the figures denoting either of such quantities. Suitable stops or recesses may be so placed as to immediately indicate when the cylinder arrives in position for either quantity to be drawn by a partial arrest of the movement of the cylinder. To show when the cylinders are both flushed, in filling them from the tank a glass tube may open from and project above the top of the cylinder $g$. In connection with the supply-tank or reservoir a glass tube may be placed outside of or in front of the tank, communicating with the interior of the tank at its lower end, thus showing the height of liquid in the tank, and, with a suitable scale, indicating the quantity of liquid in the tank and the quantity drawn therefrom; or the same result may be attained by a float resting in the liquid and connected by a lever mechanism with indicating mechanism outside the vessel.

I claim—

1. The rotary cylinder $h$, arranged within the cylinder $g$, from which it is supplied and into which it discharges, an index mechanism being combined with the apparatus, all substantially as shown and described.

2. In combination with the cylinders $g$ $h$ and the index mechanism, the supply-pipe $l$ and two-way cock $m$, substantially as described.

Executed this 9th day of September, A. D. 1871.

JOHANN SCHMIDT.

Witnesses:
 IGNATIUS LANGER,
 WILLIAM HUNING.

(132)